United States Patent
Li et al.

(10) Patent No.: US 11,042,762 B2
(45) Date of Patent: Jun. 22, 2021

(54) SENSOR CALIBRATION METHOD AND DEVICE, COMPUTER DEVICE, MEDIUM, AND VEHICLE

(71) Applicant: BAIDU ONLINE NETWORK TECHNOLOGY (BEIJING) CO., LTD., Beijing (CN)

(72) Inventors: Shirui Li, Beijing (CN); Yuanfan Xie, Beijing (CN); Xun Zhou, Beijing (CN); Liang Wang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 16 days.

(21) Appl. No.: 16/574,995

(22) Filed: Sep. 18, 2019

(65) Prior Publication Data

US 2020/0089971 A1 Mar. 19, 2020

(30) Foreign Application Priority Data

Sep. 19, 2018 (CN) .......................... 201811094353.7

(51) Int. Cl.
- *G06K 9/00* (2006.01)
- *G06K 9/62* (2006.01)
- *G06T 7/80* (2017.01)
- *G06T 7/12* (2017.01)

(52) U.S. Cl.
CPC ....... *G06K 9/00805* (2013.01); *G06K 9/6217* (2013.01); *G06T 7/12* (2017.01); *G06T 7/80* (2017.01)

(58) Field of Classification Search
CPC .... G06K 9/00805; G06K 9/6217; G06T 7/80; G06T 7/12; G01S 7/4972; G01S 17/86; G01S 7/40; G01S 13/865; G01S 13/931
See application file for complete search history.

(56) References Cited

U.S. PATENT DOCUMENTS

| | | | |
|---|---|---|---|
| 10,726,579 B1 * | 7/2020 | Huang | G01S 17/42 |
| 2011/0032570 A1 * | 2/2011 | Imaizumi | H04N 1/387 |
| | | | 358/1.15 |

(Continued)

FOREIGN PATENT DOCUMENTS

| CN | 103559791 A | 2/2014 |
|---|---|---|
| CN | 103837869 B | 6/2016 |

(Continued)

OTHER PUBLICATIONS

European Patent Application No. 19195851.1 extended Search and Opinion dated Feb. 13, 2020, 7 pages.

(Continued)

*Primary Examiner* — Ming Y Hon
(74) *Attorney, Agent, or Firm* — Lathrop GPM LLP

(57) ABSTRACT

Embodiments of the present disclosure provide a sensor calibration method, a sensor calibration device, a computer device, a storage medium, and a vehicle. The method includes: detecting surrounding objects in a travelling process of a vehicle; recognizing a static object from the surrounding objects; performing feature extraction on the static object by a camera and a lidar, respectively; and calibrating an extrinsic parameter of the camera and the lidar based on the extracted feature.

15 Claims, 3 Drawing Sheets

(56) References Cited

U.S. PATENT DOCUMENTS

| | | | |
|---|---|---|---|
| 2014/0241629 A1* | 8/2014 | Lerios | G06K 9/4652 |
| | | | 382/166 |
| 2016/0249039 A1 | 8/2016 | Tran et al. | |
| 2017/0041587 A1* | 2/2017 | Wei | G05D 1/0011 |
| 2017/0124781 A1* | 5/2017 | Douillard | G08G 1/096816 |
| 2018/0082421 A1* | 3/2018 | Yu | G06T 7/593 |
| 2019/0063945 A1* | 2/2019 | Liu | G01C 21/3658 |
| 2019/0120934 A1* | 4/2019 | Slutsky | G06T 7/33 |
| 2019/0204427 A1* | 7/2019 | Abari | G01S 17/931 |

FOREIGN PATENT DOCUMENTS

| | | |
|---|---|---|
| CN | 105678689 A | 6/2016 |
| CN | 108020826 A | 5/2018 |
| CN | 108198223 A | 6/2018 |
| CN | 108399643 A | 8/2018 |
| CN | 108519605 A | 9/2018 |
| DE | 102016225595 A1 | 6/2018 |
| WO | WO 2017057042 A1 | 4/2017 |

OTHER PUBLICATIONS

Zhang, S. "Research on obstacle detection technology based on radar and camera of driverless smart vehicles" Dissertation, Chang'an University, Xi'an, China, 2013, 65 pages.
Tang, X., "Research on Road and Obstacle Detection Method Based on Information Fusion", China Master's thesis Full-text Database Information Technology Series, Abstract, Jul. 2012, 4 pages.
Chinese Patent Application No. 201811094353.7 Office Action dated Mar. 16, 2020, 8 pages.
Chinese Patent Application No. 201811094353.7 English translation of Office Action dated Mar. 16, 2020, 8 pages.
Chinese Patent Application No. 201811094353.7 Second Office Action dated Oct. 22, 2020, 5 pages.
Chinese Patent Application No. 201811094353.7 English translation of Second Office Action dated Oct. 22, 2020, 4 pages.
Japanese Patent Application No. 2019-169174 Office Action dated Sep. 29, 2020, 4 pages.
Japanese Patent Application No. 2019-169174 English translation of Office Action dated Sep. 29, 2020, 4 pages.

* cited by examiner

US 11,042,762 B2

SENSOR CALIBRATION METHOD AND DEVICE, COMPUTER DEVICE, MEDIUM, AND VEHICLE

CROSS-REFERENCE TO RELATED APPLICATIONS

This application claims priority to and benefits of Chinese Patent Application No. 201811094353.7, filed with the National Intellectual Property Administration of P. R. China on Sep. 19, 2018, the entire contents of which are incorporated herein by reference.

TECHNICAL FIELD

The present disclosure relates to the field of computer technologies, and more particularly, to a sensor calibration method, a sensor calibration device, a computer device, a storage medium, and a vehicle.

BACKGROUND

In the autonomous driving technology, cameras and lidars are important components in the autonomous driving system, and can be used to perceive the surrounding environment of the vehicle, such as lane line detection, road tooth detection, obstacle detection, and traffic sign recognition. Considering the respective characteristics of the camera and the lidar, the perception during the autonomous driving can be better accomplished by using the camera and the lidar in combination.

SUMMARY

Embodiments of an aspect of the present disclosure provide a sensor calibration method, including: detecting surrounding objects in a travelling process of a vehicle; recognizing a static object from the surrounding objects; performing feature extraction on the static object by a camera and a lidar, respectively; and calibrating an extrinsic parameter of the camera and the lidar based on the extracted feature.

Embodiments of another aspect of the present disclosure provide a computer device. The computer device includes one or more processors, and a storage device configured to store one or more programs. When the one or more programs are executed by the one or more processors, the one or more processors are caused to implement the sensor calibration method according to any embodiment of the present disclosure.

Embodiments of another aspect of the present disclosure provide a computer storage medium having stored thereon a computer program that, when executed by a processor, causes the sensor calibration method according to any embodiment of the present disclosure to be implemented.

Embodiments of yet another aspect of the present disclosure provide a vehicle. The vehicle includes a vehicle body, the computer device according to an embodiment of the present disclosure, and at least two sensors disposed on the vehicle body. The at least two sensors include a lidar and a camera, and the at least two sensors respectively communicate with the computer device.

DETAILED DESCRIPTION

The present disclosure will be described in detail below with reference to the accompanying drawings and the embodiments. Embodiments described herein with reference to drawings are explanatory, serve to explain the present disclosure, and are not construed to limit the present disclosure. In addition, it should also be noted that, for convenience of description, only part but not all structures related to the present disclosure are illustrated in the accompanying drawings.

The extrinsic parameter calibration of the camera and the lidar can affect the accuracy of the results produced, which makes it an important part of the autonomous driving technology. In the related art, the extrinsic parameter calibration from the camera to the lidar often requires a special calibration object or is completed in a calibration room, the operation is complex, and the vehicle is required to be regularly returned to the factory for calibration, making it unsuitable for automatic calibration in driving process. Therefore, when the data acquired by the camera and the lidar are greatly deviated due to looseness of the camera and the lidar in the driving process, the rapid adaptive calibration of the camera and the lidar will be of great significance for autonomous driving.

Embodiment 1

Figure 1:
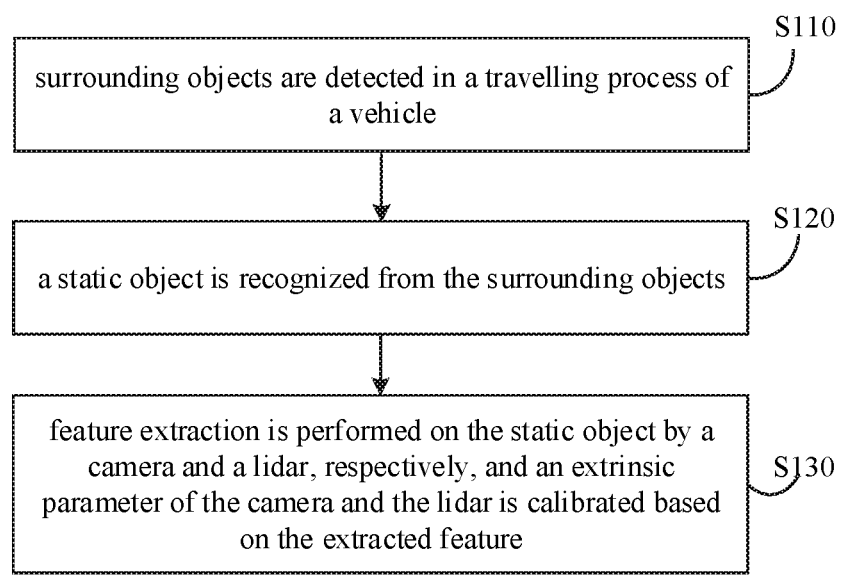
FIG. 1 is a flow chart of a sensor calibration method according to Embodiment 1 of the present disclosure.

FIG. 1 is a flow chart of a sensor calibration method according to Embodiment 1 of the present disclosure. The embodiment may be applicable to the case of calibrating a sensor, the method may be performed by a sensor calibration device, which can be implemented by means of software and/or hardware, and can be configured on a computing device. The computing device may be configured on a vehicle, such as an unmanned vehicle with control and computing capabilities. As shown in FIG. 1, the method may include the following operations.

At block S110, surrounding objects are detected in a travelling process of a vehicle.

During travelling of the vehicle, the surrounding object may be detected according to data acquired by sensors configured on the vehicle for sensing objects around the vehicle (such as a camera, a lidar, etc.), and in combination with an object recognition method.

In an embodiment, depending on the characteristics of the surrounding environment of the vehicle, the surrounding objects may be determined according to the detection result of a sensor. For example, when there are few dynamic objects in the surrounding environment, the image captured by the camera may be used as input of a pre-trained obstacle recognition model, to detect the type of objects in the surrounding environment of the vehicle. When there are more dynamic objects in the surrounding environment, the three-dimensional (3D) scene construction may be performed based on point cloud data, to detect the type of objects in the surrounding environment of the vehicle.

In at least one embodiment, detecting the surrounding objects may include acts of: performing obstacle detection by the camera and the lidar, respectively; performing verification on an obstacle detection result of the camera and an obstacle detection result of the lidar, to obtain a final obstacle detection result; and determining the surrounding objects based on the final obstacle detection result.

The obstacle may be an object outside the vehicle in the surrounding environment. Considering the respective characteristics of the camera and lidar in object detection, for example, in the process of detecting the obstacle, a fine classification of obstacles may be achieved by using the image acquired by the camera and based on deep learning, and a rough classification of obstacles may be achieved based on the point cloud data acquired by the lidar. The determination of the motion state of the object is mainly based on the lidar. Therefore, by performing verification on the detection results of the camera and the lidar, their advantages can be exerted, and the accuracy of object detection can be improved.

At block S120, a static object is recognized from the surrounding objects.

After the surrounding object is recognized, the objects of different motion states can be recognized and classified according to their position change characteristics in the same time, and the static object can be obtained. The static object may be an object having a fixed position in a world coordinate system, including one or more of a car, a house, a tree, and a utility pole.

In at least one embodiment, recognizing the static object from the surrounding objects may include acts of: recognizing the static object from the surrounding objects based on a pre-trained recognition model. For example, the recognized surrounding objects may be inputted into a pre-trained object classifier, to obtain the static object.

Compared with the dynamic object in the surrounding environment, the position change of the static object relative to the vehicle is merely related to the speed of the vehicle. Therefore, in the process of sensor calibration, by using the static object as the standard object for calibration, the calibration process can be simplified, and the computational complexity in the calibration process can be reduced. Moreover, in the embodiment, the static object may belong to a natural scene object during traveling of the vehicle, which has universality, and the applicability of the calibration method in the embodiment in the travelling process of the vehicle can be improved.

At block S130, feature extraction is performed on the static object by a camera and a lidar, respectively, and an extrinsic parameter of the camera and the lidar is calibrated based on the extracted feature.

The environment data including the static object may be acquired simultaneously by the camera and the lidar, and the position coordinate of the static object in a camera coordinate system and the position coordinate of the static object in a lidar coordinate system can be determined based on object recognition and feature extraction technology. The key points that can characterize the static object may be selected, and the coordinates of key points on the static object may be taken as its position coordinate. Then, based on the coordinate transformation between coordinate systems, when the coordinates of the key points in the camera coordinate system coincide with those in the lidar coordinate system, it can be determined the static objects in the two coordinate systems coincide, the transformation parameters involved in the coordinate transformation can be determined, thus automatic calibration between the camera and the lidar can be realized. The sensor calibration method in the embodiment can be implemented based on data acquired by the camera and the lidar at any time during the running of the vehicle, such that the convenience of sensor calibration can be improved, tedious process of returning the vehicle to the factory for calibration can be avoided, and the travelling safety of the vehicle can be improved.

With the technical solution of the embodiment, in the travelling process of the vehicle, the surrounding objects are detected, the static object is recognized from the surrounding objects, feature extraction is performed on the static object by the camera and the lidar respectively, and the extrinsic parameter of the camera and the lidar is calibrated based on the extracted feature. Thereby, the sensor calibration during travelling of the vehicle can be achieved, the convenience of sensor calibration can be improved, and the travelling safety of vehicle can be improved. Moreover, in the travelling process of the vehicle, the static object in the natural scene is selected as the standard object for calibration, the calibration process can be simplified, the computational complexity in the calibration process can be reduced, and the applicability of the calibration method in the travelling process of the vehicle can be improved.

Embodiment 2

Figure 2:
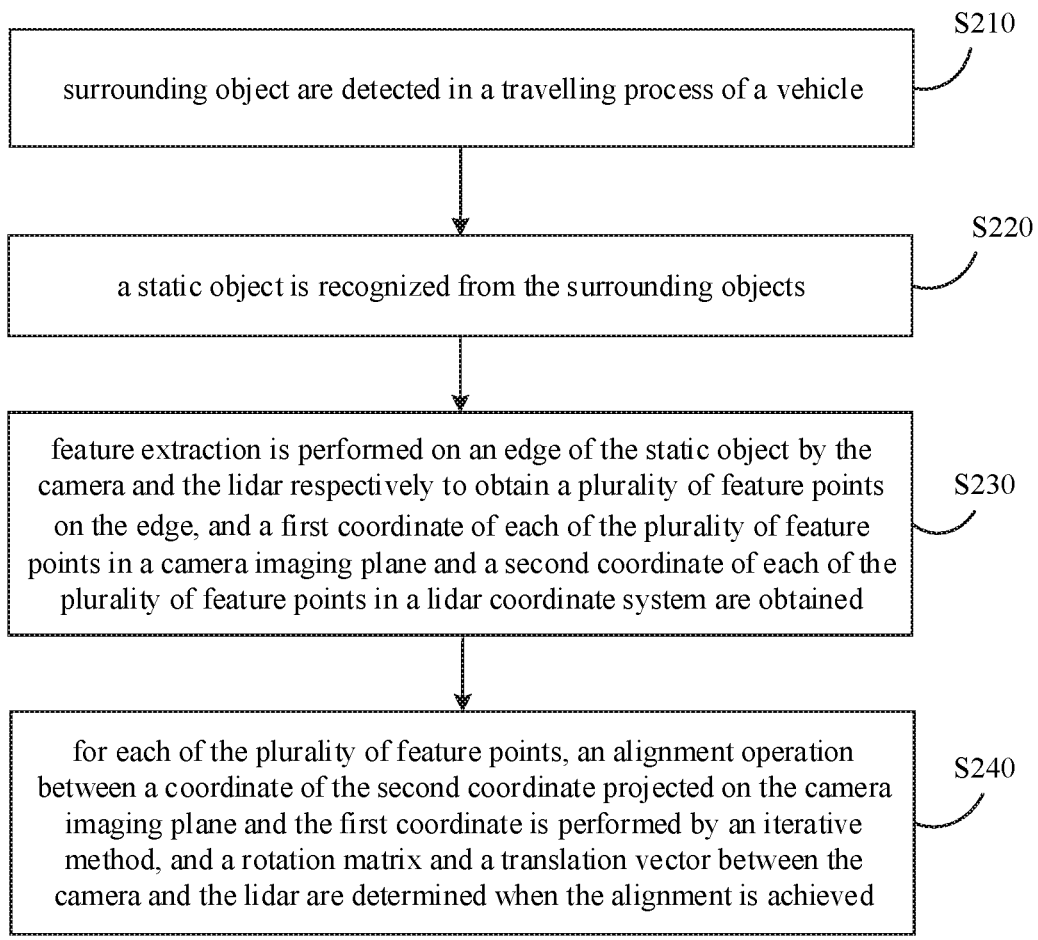
FIG. 2 is a flow chart of a sensor calibration method according to Embodiment 2 of the present disclosure.

FIG. 2 is a flow chart of a sensor calibration method according to Embodiment 2 of the present disclosure. The embodiment is on the basis of embodiment 1, as shown in FIG. 2, the method may include the following.

At block S210, surrounding objects are detected in a travelling process of a vehicle.

At block S220, a static object is recognized from the surrounding objects.

At block S230, feature extraction is performed on an edge of the static object by the camera and the lidar respectively to obtain a plurality of feature points on the edge, and a first coordinate of each of the plurality of feature points in a camera imaging plane and a second coordinate of each of the plurality of feature points in a lidar coordinate system are obtained.

Specifically, during the running of the vehicle, image data including the static object may be acquired by the camera, and the contour of the static object on the image may be recognized based on image recognition technology, and the first coordinate of each of the plurality of feature points in the camera imaging plane can be determined. The camera imaging plane is in an image coordinate system.

At the same time when the camera acquires the image data, the point cloud data of the surrounding environment of the vehicle may be acquired simultaneously by the lidar, and 3D environment image may be obtained by 3D scene construction. Then, based on static object recognition, the contour of the static object on the 3D environment image can be determined, and the second coordinate of each of the plurality of feature points in the lidar coordinate system can be determined. The second coordinate is a 3D coordinate, and the second coordinate and the first coordinate correspond to the same feature point on the edge of the static object.

In at least one embodiment, the edge may include one or more of a straight line and a circular ring. For example, the edge of a tree on the road side is a straight line, the edge of the utility pole is also a straight line, and the edge of a tire of a vehicle on the road side is a circular ring. The feature extraction of the straight line may be affected by noise, and the calibration accuracy can be affected, the feature extraction of the circular ring may be more suitable, for the circular ring may have a circular equation, and feature extraction can be performed in combination with the circular equation, such that the influence of noise can be reduced, and the calibration accuracy can be improved.

At block S240, for each of the plurality of feature points, an alignment operation between a coordinate of the second coordinate projected on the camera imaging plane and the first coordinate is performed by an iterative method, and a rotation matrix and a translation vector between the camera and the lidar are determined when the alignment is achieved.

In order to simplify the transformation operation between the 3D coordinates and the two-dimensional (2D) coordinates, the second coordinate in the lidar coordinate system may be projected onto the camera imaging plane to obtain a third coordinate, i.e., the 3D point cloud data is converted into 2D data. Then, in an iterative transformation manner, and for each of the plurality of feature points, the alignment operation between the first coordinate and the third coordinate may be performed on the camera imaging plane, when the first coordinate coincides with the third coordinate (i.e., coordinate alignment), the rotation matrix corresponding to the rotation operation in the coordinate alignment process can be determined, and the translation vector corresponding to the translation operation can also be determined, and the rotation matrix and the translation vector may be used as calibration parameters between the camera and the lidar.

In an embodiment, in the process of coordinate alignment, the coordinate of a feature point may be fixed, and position coordinate of another feature point may be changed by iteration, until the coordinates of the two feature points are aligned. For example, the first coordinate may be fixed, and the position of the third coordinate may be sequentially changed, until it is aligned with the first coordinate. The coordinate transformation parameters involved in the third coordinate may be used as the extrinsic parameter between the camera and the sensor.

In addition, after the alignment operation between the first coordinate and the third coordinate is performed on the camera imaging plane, based on a transformation relationship between the image coordinate system and the camera coordinate system and a projection transformation relationship of 3D coordinates, the rotation matrix and the translation vector determined in the coordinate alignment process may be transformed and calculated, to obtain the coordinate transformation parameters between the feature points on the edge of the static object in the camera coordinate system and the laser point cloud coordinate system, as the final extrinsic parameter between the camera and the lidar.

With the technical solution of the embodiment, in the travelling process of the vehicle, the surrounding objects are detected, the static object is recognized from the surrounding objects, feature extraction is performed on the edge of the static object by the camera and the lidar respectively to obtain a plurality of feature points on the edge, and the automatic calibration between camera and lidar is realized by using coordinate transformation of the feature points in the image coordinate system and laser point cloud coordinate system respectively, the coordinate transformation between the image coordinate system and the laser point cloud coordinate system is performed by using multiple feature points on the edge to realize automatic calibration between the camera and the laser radar. Thereby, the sensor calibration during travelling of the vehicle can be achieved, and the convenience of sensor calibration can be improved. Moreover, a simple graphic is selected as the contour edge in the edge recognition process of the static object, the accuracy of edge recognition and sensor calibration can be improved.

Embodiment 3

Figure 3:
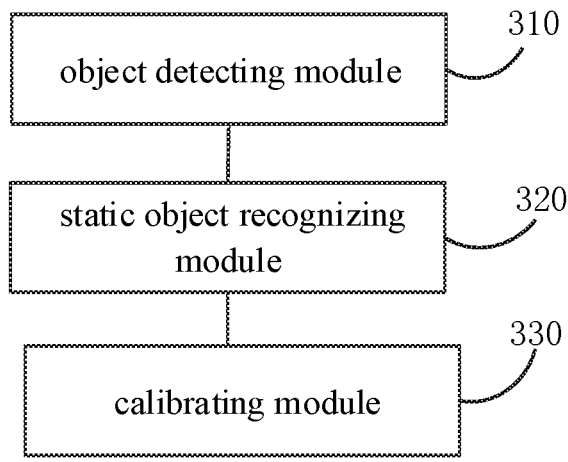
FIG. 3 is a schematic diagram of a sensor calibration device according to Embodiment 3 of the present disclosure.

FIG. 3 is a schematic diagram of a sensor calibration device according to Embodiment 3 of the present disclosure. The embodiment may be applicable to the case of calibrating a sensor, the device may be implemented by means of software and/or hardware, and may be configured on a computing device. The computing device may be configured on a vehicle, such as an unmanned vehicle with control and computing capabilities.

As shown in FIG. 3, the device includes an object detecting module 310, a static object recognizing module 320, and a calibrating module 330. The object detecting module 310 is configured to detect surrounding objects in a travelling process of a vehicle. The static object recognizing module 320 is configured to recognize a static object from the surrounding objects. The calibrating module 330 is configured to perform feature extraction on the static object by a camera and a lidar respectively, and calibrate an extrinsic parameter of the camera and the lidar based on the extracted feature.

In at least one embodiment, the object detecting module 310 includes an obstacle detecting unit, and a detection result verification unit. The obstacle detecting unit is configured to perform obstacle detection by the camera and the lidar respectively. The detection result verification unit is configured to perform verification on an obstacle detection result of the camera and an obstacle detection result of the lidar, to obtain a final obstacle detection result, and determine the surrounding objects based on the final obstacle detection result.

In at least one embodiment, the static object recognizing module 320 is configured to recognize the static object from the surrounding objects based on a pre-trained recognition model.

In at least one embodiment, the calibrating module includes a coordinate obtaining unit, and a coordinate alignment unit. The coordinate obtaining unit is configured to perform feature extraction on an edge of the static object by the camera and the lidar respectively to obtain a plurality of feature points on the edge, and obtain a first coordinate of each of the plurality of feature points in a camera imaging plane and a second coordinate of each of the plurality of feature points in a lidar coordinate system. The coordinate alignment unit is configured to, for each of the plurality of feature points, perform an alignment operation between a coordinate of the second coordinate projected on the camera imaging plane and the first coordinate by an iterative method, and determine a rotation matrix and a translation vector between the camera and the lidar when the alignment is achieved.

In at least one embodiment, the edge includes one or more of a straight line and a circular ring.

In at least one embodiment, the static object includes one or more of a car, a house, a tree, and a utility pole.

The sensor calibration device provided by the embodiment of the present disclosure can perform the sensor calibration method provided by any embodiment of the present disclosure, and can have the corresponding functional modules for executing the method, and can achieve corresponding beneficial effects.

Embodiment 4

Figure 4:
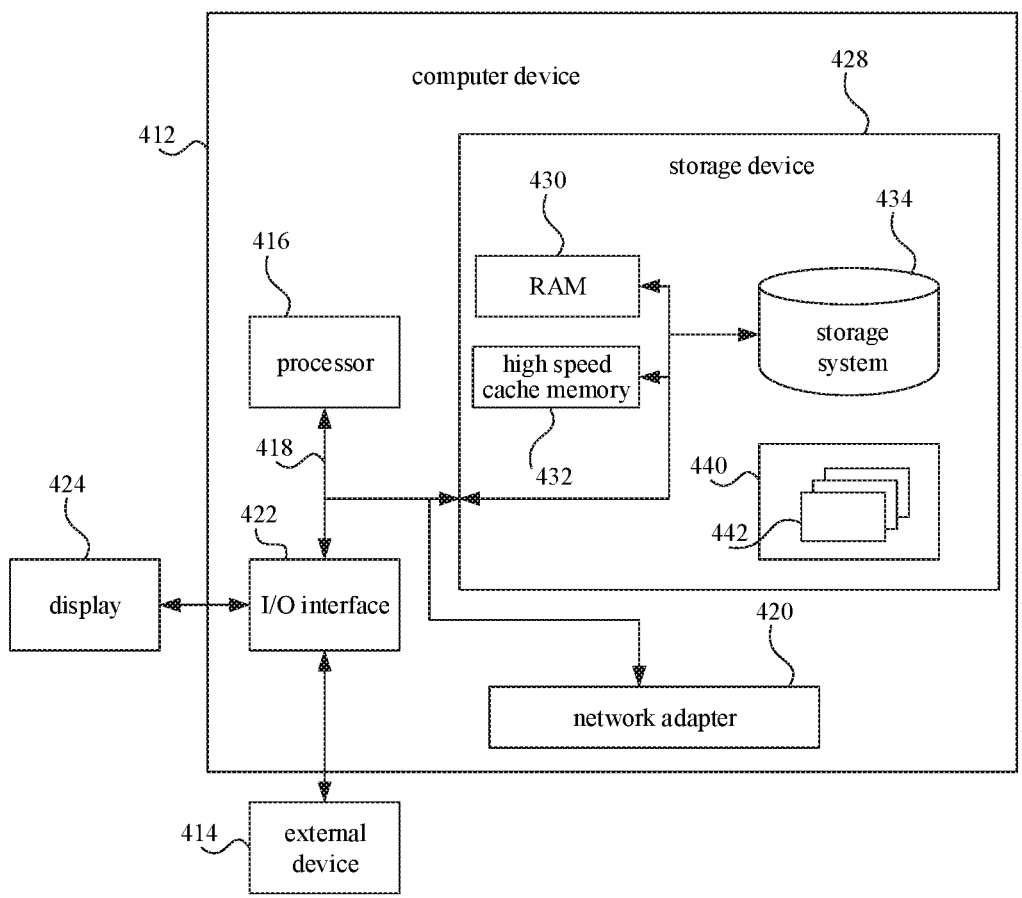
FIG. 4 is a schematic diagram of a computer device according to Embodiment 4 of the present disclosure.

FIG. 4 is a schematic diagram of a computer device according to Embodiment 4 of the present disclosure. FIG. 4 illustrates a block diagram of a computer device 412 suitable for implementing embodiments of the present disclosure. The computer device 412 shown in FIG. 4 is merely an example, and should not impose any limitation to the functions and scopes of embodiments of the present disclosure.

As shown in FIG. 4, the computer device 412 may be embodied in the form of a general-purpose computing device. Components of the computer device 412 may include, but are not limited to, one or more processors 416, a storage device 428, and a bus 418 that connects different components (including the storage device 428 and the processor 416).

The bus 418 represents one or more of any of several types of bus structures, including a memory bus or a memory controller, a peripheral bus, an accelerated graphics port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 412 typically includes a variety of computer system readable media. These media may be any available media accessible by the computer device 412, including volatile and non-volatile media, removable and non-removable media.

The storage device 428 may include a computer system readable medium in the form of volatile memory, such as a random-access memory (hereinafter referred to as RAM) 430 and/or a high-speed cache memory 432. The computer device 412 may further include other removable or non-removable, volatile or non-volatile computer system storage medium. By way of example only, the storage system 434 may be configured to read and write non-removable and non-volatile magnetic media (not shown in FIG. 4, commonly referred to as a "hard drive"). Although not shown in FIG. 4, a magnetic disk driver for reading from and writing to a removable and non-volatile magnetic disk (such as "floppy disk") and a disk driver for reading from and writing to a removable and non-volatile optical disk (such as compact disk read only memory (hereinafter referred to as CD-ROM), a digital video disc read only memory (hereinafter referred to as DVD-ROM) or other optical media can be provided. In these cases, each driver may be connected to the bus 418 via one or more data medium interfaces. The storage device 428 may include at least one program product. The program product has a set of (such as, at least one) program modules configured to perform the functions of various embodiments of the present disclosure.

A program/utility 440 having a set of (at least one) the program modules 442 may be stored in, for example, the storage device 428. The program module 442 may include, but is not limited to, an operating system, one or more application programs, other programs modules and program data. Each of these examples, or some combination thereof, may include an implementation of a network environment. The program module 442 is generally configured to perform functions and/or methods in embodiments of the present disclosure.

The computer device 412 may also communicate with one or more external devices 414 (e.g., a keyboard, a pointing device, a camera, a display 424). Furthermore, the computer device 412 may also communicate with one or more devices enabling a user to interact with the computer device 412 and/or other devices (such as a network card, a modem, etc.) enabling the computer device 412 to communicate with one or more computer devices. This communication can be performed via the input/output (I/O) interface 422. Also, the computer device 412 may communicate with one or more networks (such as a local area network (hereafter referred to as LAN), a wide area network (hereafter referred to as WAN) and/or a public network such as the Internet) through a network adapter 420. As shown in FIG. 4, the network adapter 420 communicates with other modules of the computer device 412 over the bus 418. It should be understood that, although not shown in FIG. 4, other hardware and/or software modules may be used in conjunction with the computer device 412, which include, but are not limited to, microcode, device drivers, redundant processing units, external disk drive arrays, RAID systems, tape drives, as well as data backup storage systems and the like.

The processor 416 is configured to execute various functional applications and data processing by running a program stored in the storage device 428, for example, to implement the sensor calibration method provided by the above-described embodiments of the present disclosure. The method includes: detecting surrounding objects in a travelling process of a vehicle; recognizing a static object from the surrounding objects; performing feature extraction on the static object by a camera and a lidar, respectively; and calibrating an extrinsic parameter of the camera and the lidar based on the extracted feature.

Embodiment 5

Embodiment 5 of the present disclosure further provides a computer storage medium having stored thereon a computer program that, when executed by a processor, causes the sensor calibration method according to any embodiment of the present disclosure to be implemented. The method includes: detecting surrounding objects in a travelling process of a vehicle; recognizing a static object from the surrounding objects; performing feature extraction on the static object by a camera and a lidar, respectively; and calibrating an extrinsic parameter of the camera and the lidar based on the extracted feature.

The above non-transitory computer readable storage medium may adopt any combination of one or more computer readable medium(s). The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. More specific examples (a non-exhaustive list) of the computer readable storage medium include: an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by or in connection with an instruction executed system, apparatus or device.

The computer readable signal medium may include a data signal propagating in baseband or as part of carrier wave, which carries computer readable program codes. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport programs used by or in connection with an instruction executed system, apparatus or device.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Embodiment 6

Embodiments of the present disclosure further provide a vehicle. The vehicle includes a vehicle body, the computer device according to an embodiment of the present disclosure, and at least two sensors disposed on the vehicle body. The at least two sensors include a lidar and a camera, and the at least two sensors respectively communicate with the computer device.

The location of the sensor on the vehicle body can be set according to the design of the vehicle. The vehicle may be an unmanned vehicle with control and computing capabilities.

In the travelling process of the vehicle, after the sensor acquires data, it may send the data to the computer device, such that the computer device can perform data processing, such as perform calibration between the lidar and the camera.

The above are only the preferred embodiments of the present disclosure and the technical principles applied thereto. Those skilled in the art will appreciate that the present disclosure is not limited to the specific embodiments described herein, and that various modifications, changes and substitutions may be made without departing from the scope of the present disclosure. Although the present disclosure has been described in detail by the above embodiments, the present disclosure is not limited to the above embodiments, and other equivalent embodiments may be included without departing from the scope of the present disclosure, and the scope of the present disclosure is determined by the scope of the appended claims.

What is claimed is:

1. A sensor calibration method, comprising:
   detecting surrounding objects in a travelling process of a vehicle;
   recognizing a static object from the surrounding objects;
   performing feature extraction on the static object by a camera and a lidar, respectively; and
   calibrating an extrinsic parameter of the camera and the lidar based on the extracted feature,
   wherein performing feature extraction on the static object by the camera and the lidar and calibrating the extrinsic parameter of the camera and the lidar based on the extracted feature comprises:
   performing feature extraction on an edge of the static object by the camera and the lidar respectively to obtain a plurality of feature points on the edge, and obtaining a first coordinate of each of the plurality of feature points in a camera imaging plane and a second coordinate of each of the plurality of feature points in a lidar coordinate system;
   for each of the plurality of feature points, performing an alignment operation between a coordinate of the second coordinate projected on the camera imaging plane and the first coordinate by an iterative method; and
   determining a rotation matrix and a translation vector between the camera and the lidar when the alignment is achieved.

2. The sensor calibration method according to claim 1, wherein detecting the surrounding objects comprises:
   performing obstacle detection by the camera and the lidar, respectively;
   performing verification on an obstacle detection result of the camera and an obstacle detection result of the lidar, to obtain a final obstacle detection result; and
   determining the surrounding objects based on the final obstacle detection result.

3. The sensor calibration method according to claim 1, wherein recognizing the static object from the surrounding objects comprises:
   recognizing the static object from the surrounding objects based on a pre-trained recognition model.

4. The sensor calibration method according to claim 1, wherein the edge comprises one or more of a straight line and a circular ring.

5. The sensor calibration method according to claim 1, wherein the static object comprises one or more of a car, a house, a tree, and a utility pole.

6. A sensor calibration device, comprising:
   one or more processors;
   a storage device, configured to store one or more programs,
   wherein when the one or more programs are executed by the one or more processors, the one or more processors are caused to:
   detect surrounding objects in a travelling process of a vehicle;
   recognize a static object from the surrounding objects; and
   perform feature extraction on the static object by a camera and a lidar respectively, and calibrate an extrinsic parameter of the camera and the lidar based on the extracted feature;
   wherein in performing feature extraction on the static object by the camera and the lidar and calibrating the extrinsic parameter of the camera and the lidar based on the extracted feature, the one or more processors are configured to:
   perform feature extraction on an edge of the static object by the camera and the lidar respectively to obtain a plurality of feature points on the edge, and obtain a first coordinate of each of the plurality of feature points in a camera imaging plane and a second coordinate of each of the plurality of feature points in a lidar coordinate system; and for each of the plurality of feature points, perform an alignment operation between a coordinate of the second coordinate projected on the camera imaging plane and the first coordinate by an iterative method, and determine a rotation matrix and a translation vector between the camera and the lidar when the alignment is achieved.

7. The sensor calibration device according to claim 6, wherein in detecting the surrounding objects, the one or more processors are configured to:
perform obstacle detection by the camera and the lidar respectively;
perform verification on an obstacle detection result of the camera and an obstacle detection result of the lidar, to obtain a final obstacle detection result; and
determine the surrounding objects based on the final obstacle detection result.

8. The sensor calibration device according to claim 6, wherein in recognizing the static object from the surrounding objects, the one or more processors are configured to:
recognize the static object from the surrounding objects based on a pre-trained recognition model.

9. The sensor calibration device according to claim 6, wherein the edge comprises one or more of a straight line and a circular ring.

10. The sensor calibration device according to claim 6, wherein the static object comprises one or more of a car, a house, a tree, and a utility pole.

11. A non-transitory computer storage medium having stored thereon a computer program that, when executed by a processor, causes a sensor calibration method to be implemented, the method comprising:
detecting surrounding objects in a travelling process of a vehicle;
recognizing a static object from the surrounding objects;
performing feature extraction on the static object by a camera and a lidar, respectively; and
calibrating an extrinsic parameter of the camera and the lidar based on the extracted feature,
wherein performing feature extraction on the static object by the camera and the lidar and calibrating the extrinsic parameter of the camera and the lidar based on the extracted feature comprises:
performing feature extraction on an edge of the static object by the camera and the lidar respectively to obtain a plurality of feature points on the edge, and obtaining a first coordinate of each of the plurality of feature points in a camera imaging plane and a second coordinate of each of the plurality of feature points in a lidar coordinate system;
for each of the plurality of feature points, performing an alignment operation between a coordinate of the second coordinate projected on the camera imaging plane and the first coordinate by an iterative method; and
determining a rotation matrix and a translation vector between the camera and the lidar when the alignment is achieved.

12. The non-transitory computer storage medium according to claim 11, wherein detecting the surrounding objects comprises:
performing obstacle detection by the camera and the lidar, respectively;
performing verification on an obstacle detection result of the camera and an obstacle detection result of the lidar, to obtain a final obstacle detection result; and
determining the surrounding objects based on the final obstacle detection result.

13. The non-transitory computer storage medium according to claim 11, wherein recognizing the static object from the surrounding objects comprises:
recognizing the static object from the surrounding objects based on a pre-trained recognition model.

14. The non-transitory computer storage medium according to claim 11, wherein the edge comprises one or more of a straight line and a circular ring.

15. The non-transitory computer storage medium according to claim 11, wherein the static object comprises one or more of a car, a house, a tree, and a utility pole.

* * * * *